United States Patent [19]
Edmonds

[11] Patent Number: 4,989,952
[45] Date of Patent: Feb. 5, 1991

[54] TRANSPARENT LIGHT DEFLECTING PANEL FOR DAYLIGHTING ROOMS

[76] Inventor: Ian R. Edmonds, 12 Lentara St., Kenmore, 4069 Qld., Australia

[21] Appl. No.: 347,201

[22] Filed: May 4, 1989

[51] Int. Cl.$^5$ .................... G02B 17/00; G02B 27/00
[52] U.S. Cl. .................... 350/259; 219/121.67; 350/263
[58] Field of Search .................... 65/174; 430/945; 219/121.67; 350/258–263

[56] References Cited

U.S. PATENT DOCUMENTS

| | | | |
|---|---|---|---|
| 721,256 | 2/1903 | Wadsworth | 350/262 |
| 737,979 | 9/1903 | Wadsworth | 350/261 |
| 766,579 | 11/1949 | Pearson | 350/263 X |
| 4,467,168 | 8/1984 | Morgan et al. | 219/121.67 |
| 4,509,825 | 4/1985 | Otto et al. | 350/259 |
| 4,557,565 | 12/1985 | Ruck et al. | 350/262 |
| 4,699,467 | 10/1987 | Bartenbach et al. | 350/259 |
| 4,842,782 | 6/1989 | Portney et al. | 219/121.67 X |

*Primary Examiner*—Richard A. Wintercorn
*Attorney, Agent, or Firm*—Wells & White

[57] ABSTRACT

A method for producing a transparent light deflecting panel comprising making a series of parallel cuts in a sheet of transparent solid material with a laser cutting tool. Said panel when positioned in an opening in the facade of a building deflects incident daylight towards the ceiling of said building thereby improving the natural lighting within the building.

6 Claims, 9 Drawing Sheets

TRANSPARENT LIGHT DEFLECTING PANEL FOR DAYLIGHTING ROOMS

BACKGROUND OF THE INVENTION

The present invention relates to methods for producing a thin transparent panel which deflects light. While there are many uses for a panel which deflects light the embodiments of the invention described here are directed particularly to using a light deflecting panel as a window in the facade of a building for the purpose of deflecting incoming daylight upwards so that the ceiling of the building is illuminated thereby improving the natural lighting deep within the interior of the building.

The conventional means of deflecting light is by refraction in a prism of transparent material or by reflection from a metallic surface. Methods for producing transparent panels which deflect light usually utilise one or both of these means of deflecting light. In particular a light deflecting panel may be produced by moulding the surface of a sheet of glass or plastic into the form of prisms. Prismatic panels so formed have been used as focusing elements in optical systems, and as panels for diffusing light and as panels for deflecting daylight towards the interior of buildings. Reference to prismatic panels for daylighting is U.S. Pat. No 4,557,565 to Ruck et al. Prismatic sheets are deficient in that, with prismatic sheets, it is difficult to deflect light by more than about 45 degrees. For the deflection of sunlight towards the ceiling of a building deflection through angles greater than 45 degrees is frequently required. Two further deficiencies of prismatic panels as windows for improving daylighting within buildings are, firstly, that the view through prismatic panels is severely distorted and secondly, that the surface of prismatic panels is difficult to clean.

Metallic reflectors have been used to form light deflecting window panels for improved daylighting in buildings by incorporating a plurality of plane or curved metal reflectors in the form of venetian blinds inside a window or between the panes of a double glazed window. Venetian blind reflectors are deficient in that the amount of light reflected depends strongly on the angle of incidence of the light and the reflecting surfaces are difficult to clean. References to metallic reflectors as light deflecting window panels are U.S. Pat. No. 4,699,467 to Bartenbach et al and U.S. Pat. No. 4,509,825 to Otto et al.

The object of the present invention is to provide a method for producing a thin transparent light deflecting panel able to deflect light through angles greater than 90 degrees and suitable for adaptation as a window panel which deflects incoming daylight upwards so that the ceiling of a building is illuminated thereby improving the natural lighting within the building.

Another objective of the present invention is to produce a light deflecting panel which is suitable for viewing through.

Another objective is to produce a light deflecting panel which is as thin as a conventional window panel and is as easy to clean.

SUMMARY OF THE INVENTION

The present invention provides a method for producing a transparent light deflecting panel comprising the steps of making a series of parallel cuts through a sheet of transparent solid material with a laser cutting tool, and leaving narrow regions of continuous solid transparent material at the perifery of said sheet and at intervals across said sheet whereby a continuum of solid material is provided for support of the material in the cut regions of the sheet.

In another embodiment the present invention provides a method for producing a transparent light deflecting panel comprising the steps of making a series of parallel cuts partly through a sheet of transparent solid material with a laser cutting tool.

Adapted as a window for improved daylighting of building interiors the transparent light deflecting panel of this invention when positioned in the facade of a building serves to deflect daylight towards the ceiling of said building thereby improving illumination on work surfaces within said building.

In another embodiment a plurality of the light deflecting panels of this invention are incorporated as a louvre panels in a louvre window for the purpose of redirecting daylight or rejecting incident daylight depending on the tilt of the louvre panels.

Embodiments of the invention will now be described with reference to the accompanying drawings.

DETAILED DESCRIPTION OF THE INVENTION

Figure 1:
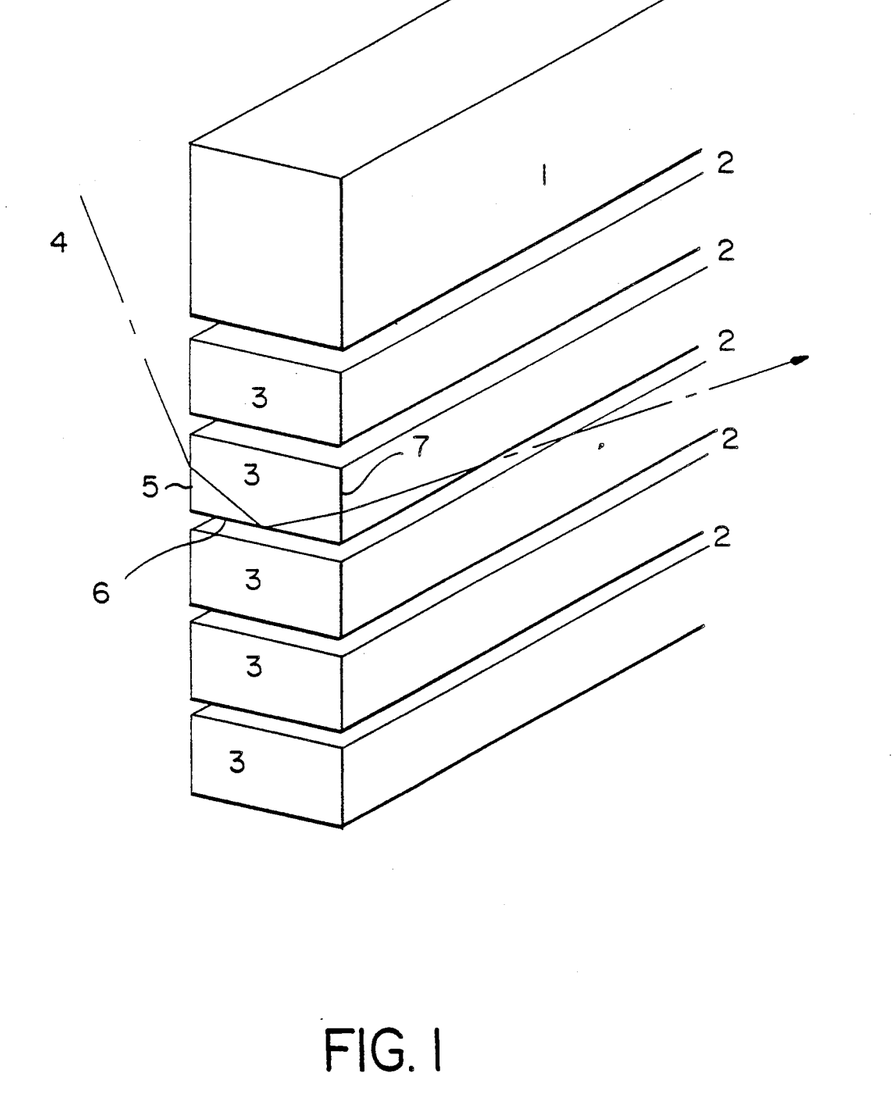
FIG. 1 is a schematic view of a portion of a transparent light deflecting panel formed by making a series of parallel cuts through a transparent solid sheet with a laser cutting tool in accordance with the present invention.

A method for producing a transparent light deflecting panel comprising making a series of parallel cuts through a sheet of transparent solid material such as acrylic with a laser cutting tool such as the type based on the carbon dioxide laser. In FIG. 1 is shown a portion of a transparent solid sheet 1 through which a series of parallel cuts 2 have been made with a laser cutting tool. The laser cuts 2 divide the sheet into parallelepipeds 3. Light ray 4 traversing a vertical plane normal to the surface of the sheet and incident on the input face 5 of a parallelepiped 3 is deflected by refraction at the input face 5 and by total internal reflection at the internal interface 6 and by refraction at the output face 7. For efficient total internal reflection the internal interface 6 must be optically smooth. A smooth finish to the internal interfaces is achieved in the process of melting followed by solidification characteristic of laser cutting.

Figure 2:
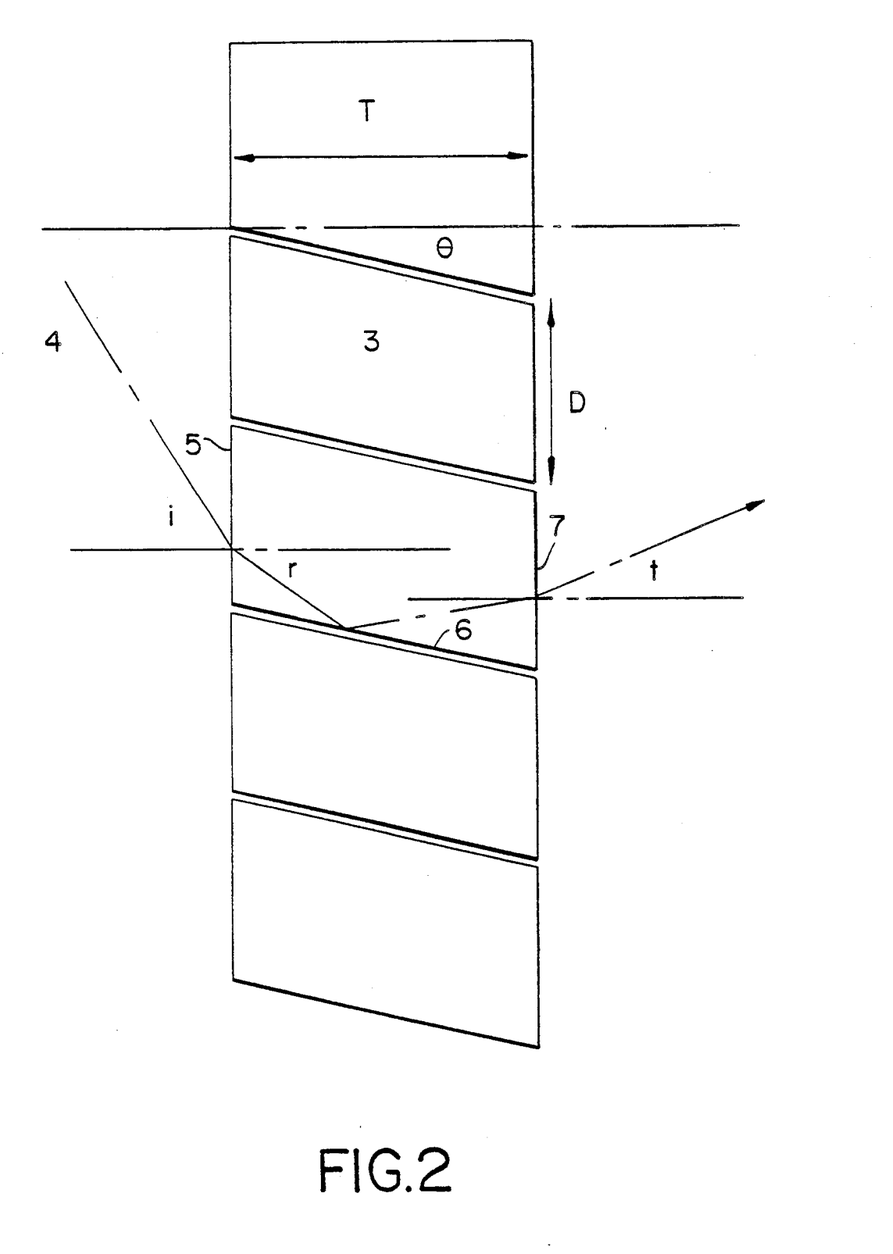
FIG. 2 is a sectional view of a light deflecting panel in vertical orientation showing the general crossection of the parallelepipeds formed by making a series of parallel cuts through a transparent solid sheet with a laser cutting tool in accordance with the present invention.

FIG. 2 is a sectional view through a portion of a light deflecting panel showing the general crossection of a parallelepiped 3 formed by making parallel cuts at spacing D through a sheet of thickness T at some angle $\theta$ to the normal to the plane of the sheet. A ray 4 traversing a vertical plane normal to the sheet and incident at angle i on the input face 5 of a parallelepiped is refracted at an an angle of refraction r given by $$r = \sin^{-1}((\sin i)/n)$$

where n is the refractive index of the solid transparent material comprising the sheet. Provided the angle of incidence on the internal interface 6 is greater that the critical angle total internal reflection occurs and the ray is refracted at the output face 7 of the parallelepiped. The exit angle t is given by $$t = \sin^{-1}(n \sin (r - 2\theta))$$

In the simplest case when the laser cuts are made normal to the sheet $\theta = 0$, i=t so that, for example, when i=60 degrees the incident ray is deflected through an angle i+t=120 degrees.

Figure 3:
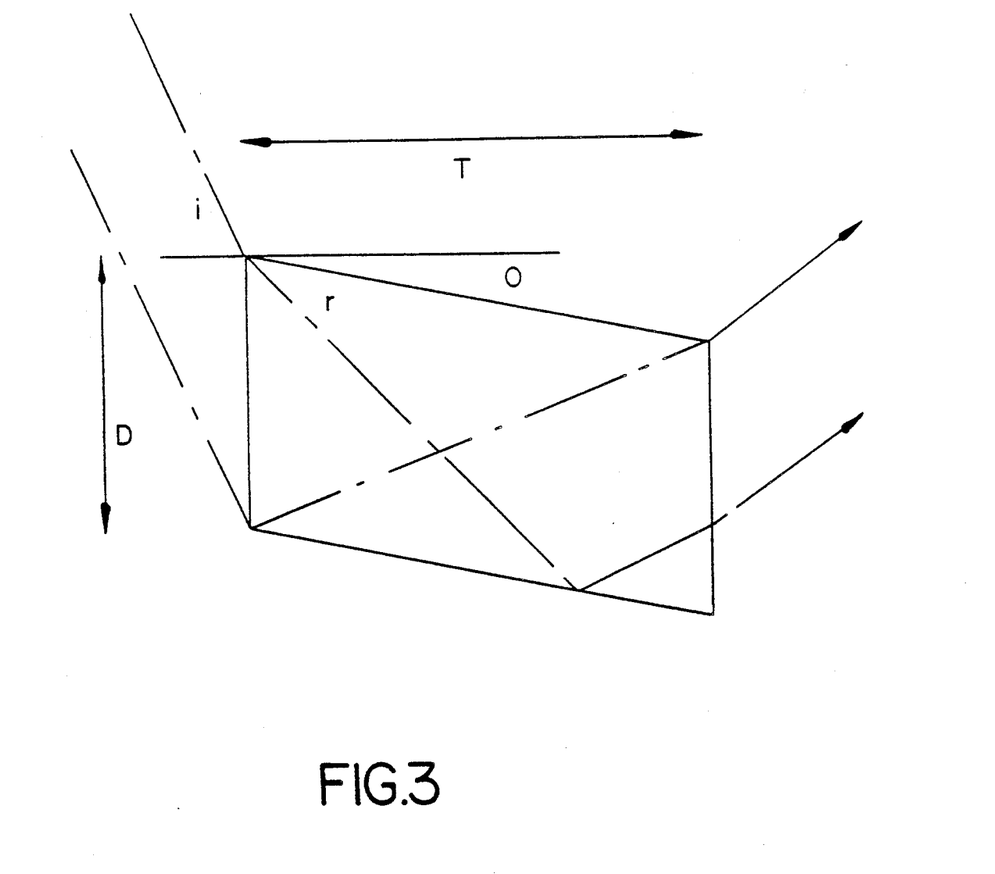
FIG. 3 is a sectional view through a parallelepiped in a light deflecting panel showing ray paths of light when the angle of incidence is such that all incident light is deflected.

FIG. 3 shows in section ray paths through a parallelepiped 3 in a light deflecting panel when the angle of incidence i is such that all incident light is deflected. In general there is a narrow range of angles of incidence within which all incident light is deflected, the extreme angles of this range being determined by the expressions $$D/T = \tan r - \tan \theta \text{ and } D/T = \tan (r - 2\theta) + \tan \theta.$$

For the case where the cuts are made normal to the sheet $\theta = 0$ and both expressions above reduce to D/T = tan r. Correspondingly there is one angle of incidence at which all light is deflected. In the adaptation of the light deflecting panel of this invention as a window for deflecting incident daylight towards the ceiling of a room a typical angle of incidence is 60 degrees. With solid transparent material of refractive index n =1.5 (acrylic), r=35 degrees and for all light deflected the ratio required is D/T =0.7. The useful range of the ratio D/T in this adaptation is between 1 and 0.5. For angles outside the range of angles within which all light is deflected the proportion of light deflected is readily calculated from the laws of optics and the geometry of the parallelepiped.

It is evident that all rays refracted at the input face into a direction parallel to the cuts will pass through the panel without deflection. Thus the view through the panel in directions substantially parallel to the angle at which the cuts are made will be undistorted.

Figure 4:
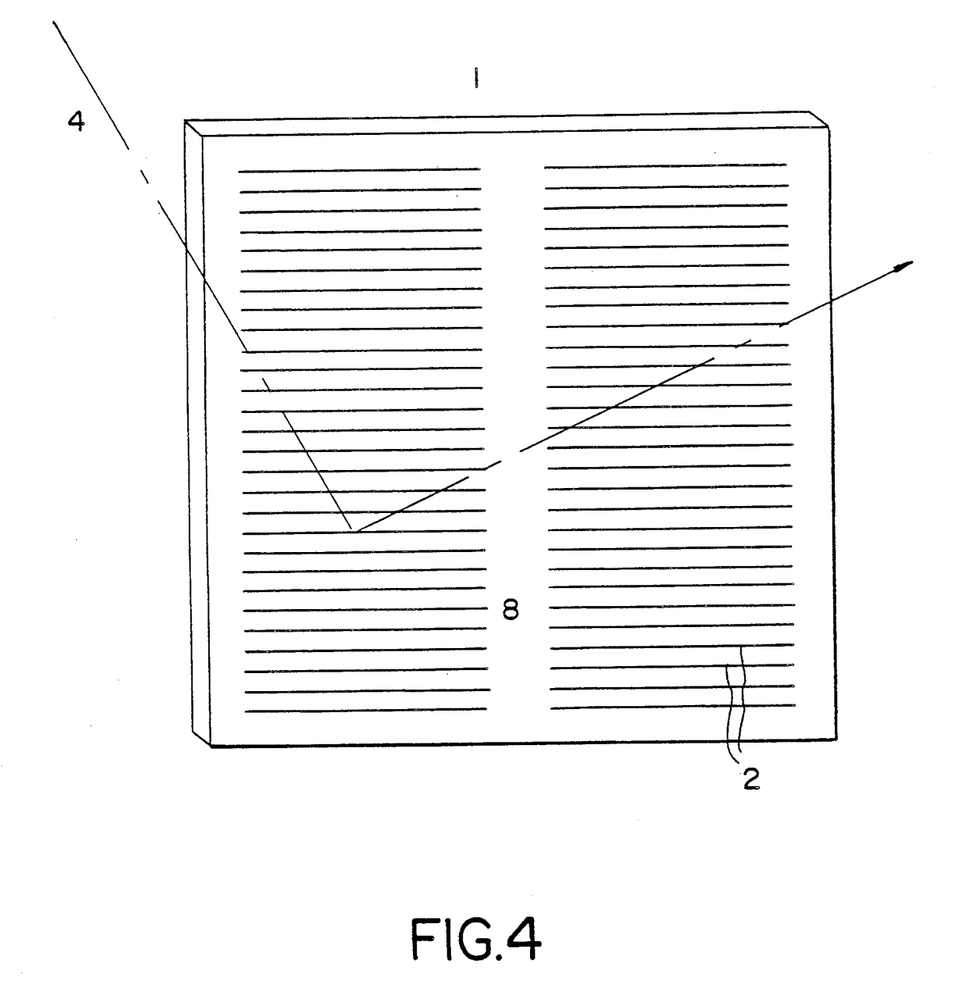
FIG. 4 is a schematic view of a light deflecting panel in vertical orientation showing the continuous regions at the perifery and at intervals across the sheet and also showing a typical ray path of daylight transmitted and deflected by the panel.

FIG. 4 shows in schematic view a light deflecting panel in vertical orientation with horizontal parallel cuts 2 made through the sheet such that downcoming rays 4 incident on the panel are deflected upwards. Also shown in this figure are the continuous regions of uncut material 8 at the perifery of the sheet and at intervals across the sheet left to provide support for the parallelepipeds in the cut regions of the sheet.

Figure 5:
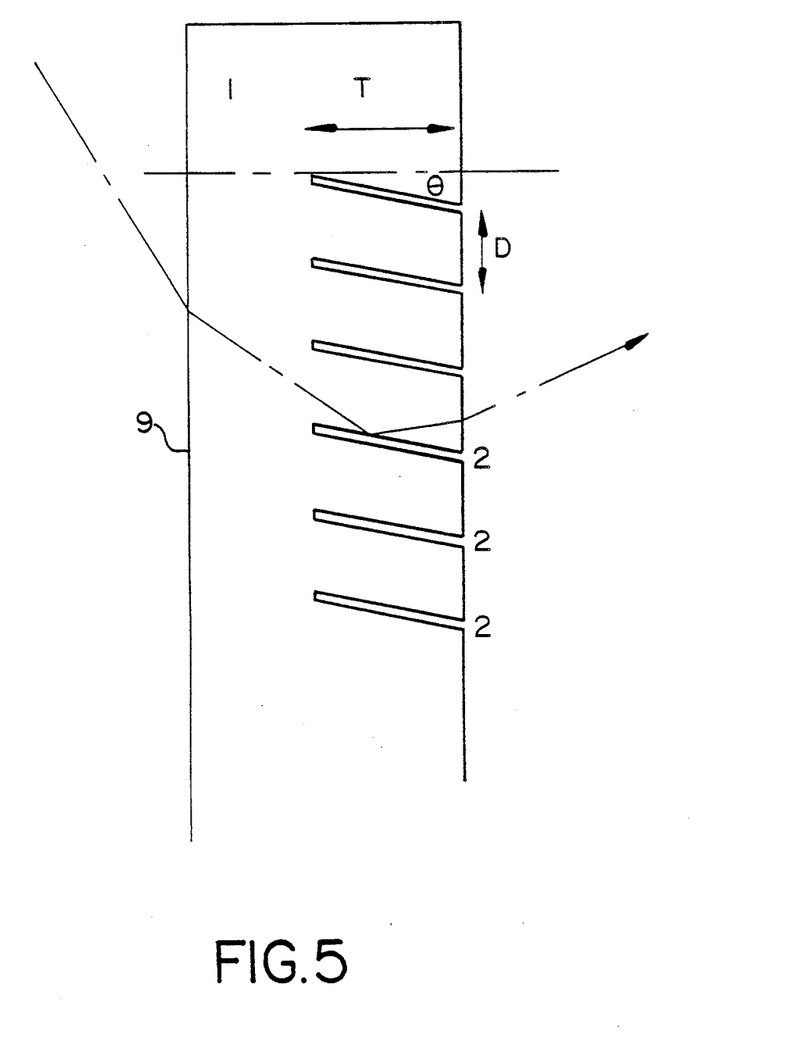
FIG. 5 shows in section a portion of a light deflecting panel produced by making a series of parallel cuts partly through a sheet of transparent solid material with a laser cutting tool in accordance with the present invention.

In FIG. 5 is shown in section a light deflecting panel which has been produced by making a series of parallel cuts 2 partly through a sheet of transparent solid material 1. The advantage of this embodiment of the invention is that one surface 9 of the sheet remains continuous and provides support for the material in the cut regions of the sheet. As the light deflecting properties depend only on the angle of cut $\theta$ and on the ratio of the distance between cuts and the depth of the cuts, D/T, the same relations apply to this embodiment as to the previous embodiment wherein the cuts are made through the sheet.

Figure 6A:
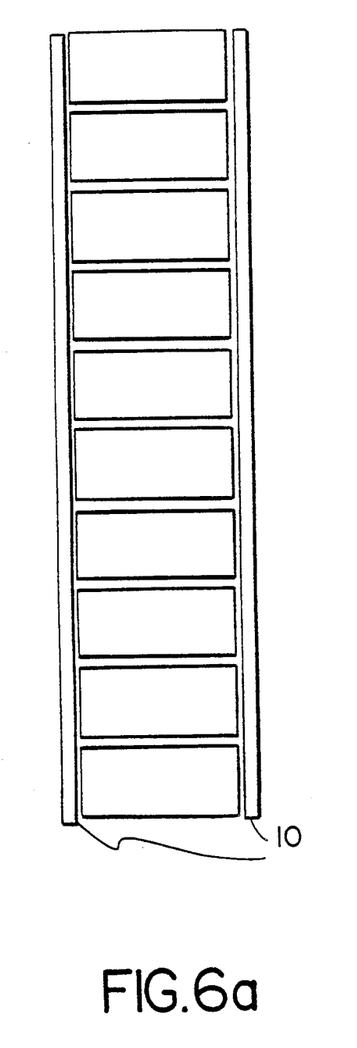
FIGS. 6A and 6B shows the manner of protecting a light deflecting panel by enclosure or lamination with thin sheets of transparent material.
Figure 6B:
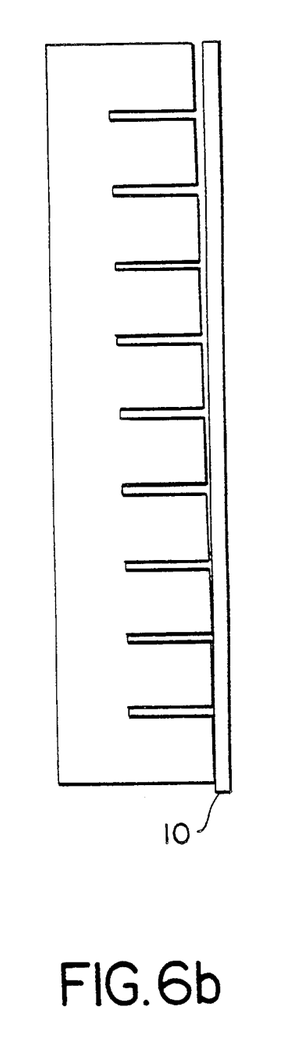

When a light deflecting panel is exposed to the weather it is necessary to prevent the entry of moisture and dust into the laser cuts. In FIG. 6 is shown in crossection the manner of protecting a light deflecting panel by laminating or enclosing the panel between two thin sheets of planar transparent material 10 in the case where the cuts penetrate the panel or by laminating to or enclosing the cut side of the panel with a thin planar transparent sheet when the cuts do not penetrate the panel.

Figure 7:
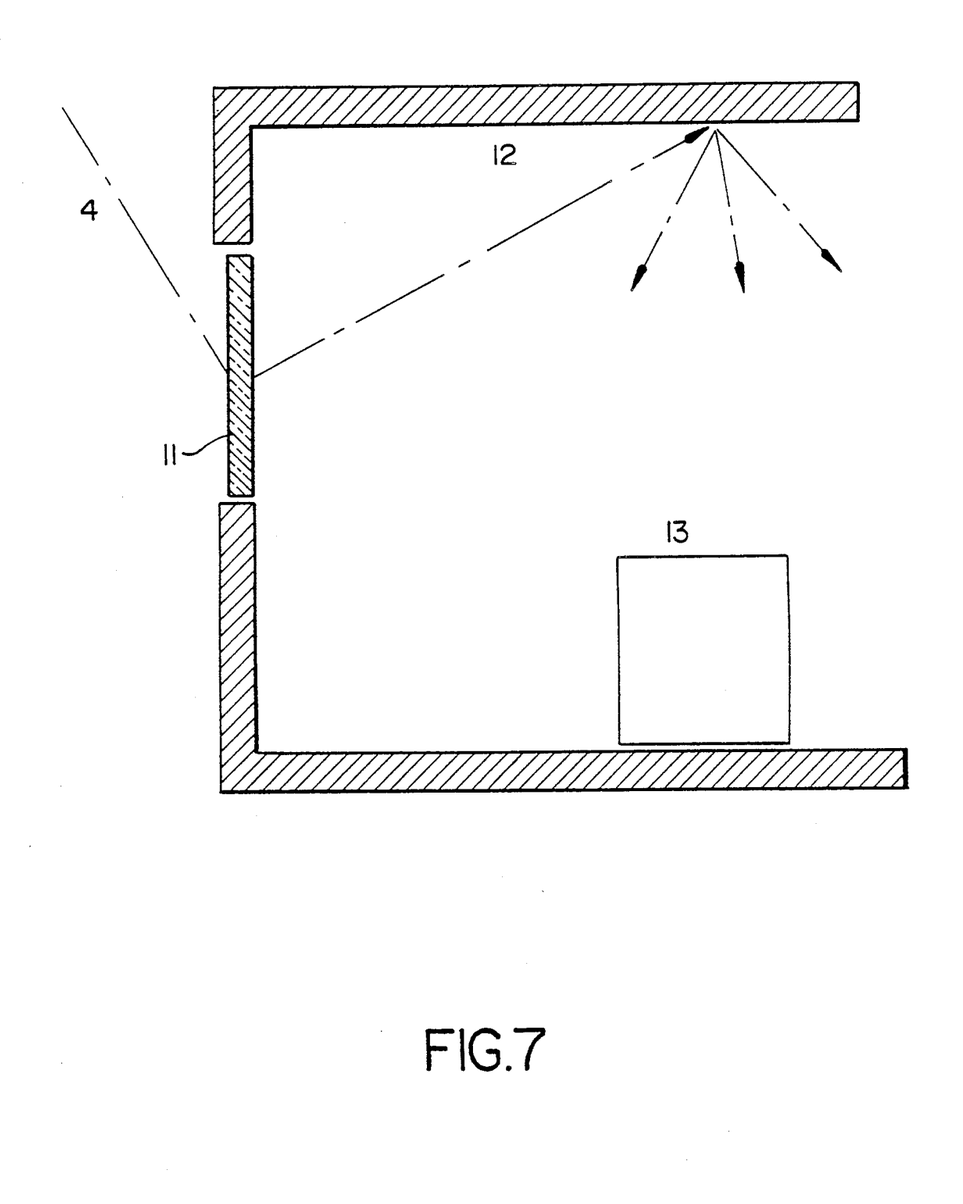
FIG. 7 shows a sectional view of a building in which a light deflecting panel mounted in vertical orientation in the facade of the building deflects incident daylight towards the ceiling of said building.

The present invention provides a panel adapted to be mounted on the facade of a building so as to deflect incident daylight towards the ceiling of said building. The panel 11 is positioned in vertical orientation, (see FIG. 7), such that incident daylight 4 is deflected by the panel 11 and impinges on the ceiling 12 which diffusely reflects the daylight so as to improve the illumination at work places 13. In this adaptation it is desirable to deflect incident daylight deep into the interior of the building. The performance in this respect can be improved by making the cuts in the panel at an angle $\theta$ to the normal to the panel such that the cuts in the panel slope from the exterior surface of the panel downwards to the interior surface of the panel. The useful range of the slope angle of the cuts, $\theta$, is between 0 and 15 degrees to the horizontal.

Figure 8:
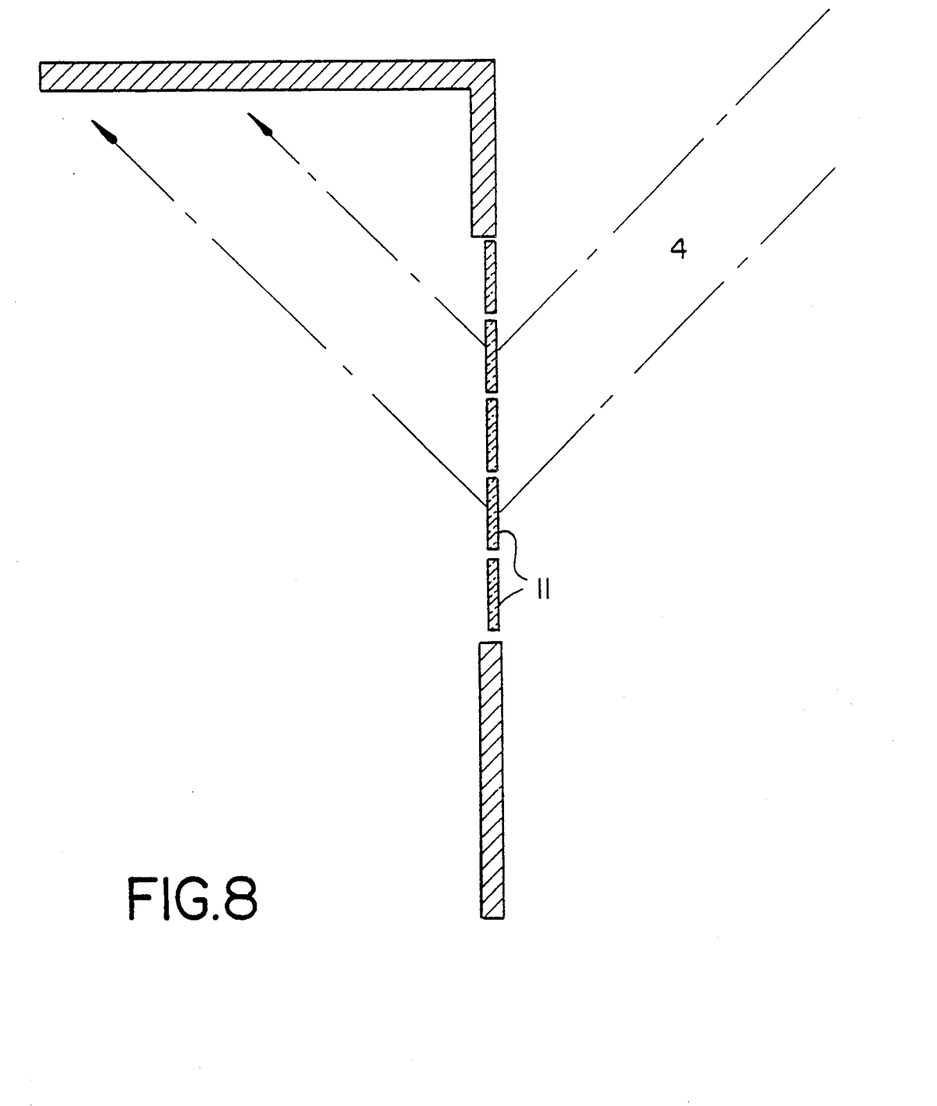
FIG. 8 is a sectional view of a plurality of transparent light deflecting panels incorporated in the facade of a building as louvre panels in a louvre window and positioned so as to deflect sunlight towards the ceiling of said building.
Figure 9:
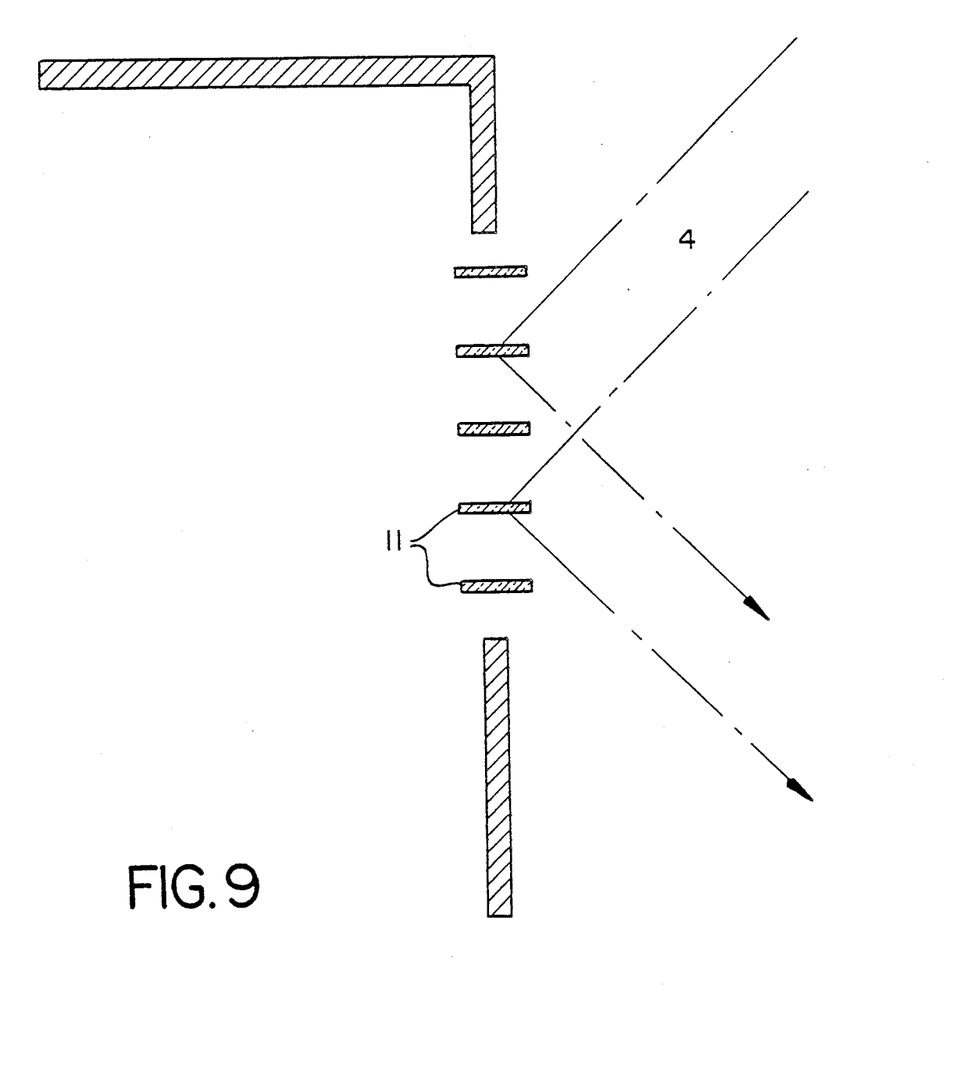
FIG. 9 is a sectional view of a plurality of transparent light deflecting panels incorporated in the facade of a building as louvre panels in a louvre window and positioned so as to deflect sunlight towards the exterior of said building.

Incident daylight may also be deflected more deeply into the building by tilting the panel about a horizontal axis such that the upper part of the panel is towards the interior of the building. By adjusting the tilt of the panel variations in the angle of incidence of sunlight can be compensated for such that the sunlight is deflected into the building at all times at substantially the same angle of elevation. For large windows however it is convenient to incorporate the light deflecting panels as louvre panels in a louvre window. In FIG. 8 is shown a plurality of light deflecting panels 11 incorporated in a louvre window in the facade of a building. With the light deflecting panels 11 in the substantially closed position rays from the sun 4 incident on the panels 11 are deflected towards the interior of the building so as to impinge on the ceiling of said building thereby improving the natural lighting within said building. With the light deflecting panels adjusted to the substantially open position, (FIG. 9), sunlight 4 incident on said open panels is deflected towards the exterior of the building. With the louvres in said open position the window has the useful and possibly unique property of rejecting sunlight while allowing excellent viewing and maximum ventilation through the open louvre panels. This embodiment of the invention is well suited to building environment control since in winter it is usually desirable to admit sunlight and keep the louvre windows closed, while in summer it is usually desirable to reject sunlight and keep the louvre windows open to maximise ventilation.

Those modifications and equivalents which fall within the spirit of the invention are to be considered a part thereof.

I claim:

1. A plane panel adapted to be mounted in vertical orientation in a opening in the facade of a building so as to redirect incident daylight towards the ceiling of said building, said panel comprising:
   a transparent plastic plate having a plurality of parallel equally spaced apart laser cuts made perpendicularly through said plate such that said plate is divided into a series of parallel, equally spaced apart horizontally aligned parallelpipeds of rectangular cross section, said parallelpipeds being suppored by a narrow continuum of said transparent plate extending around the periphery of said transparent plate and extending at intervals across said transparent plate in a direction perpendicular to the horizontal axis of said parallelpipeds.

2. A panel as in claim 1, further comprising:
   thin transparent sheets attached to the faces of said plate to prevent the entry of moisture and dust into said laser cuts.

3. A plane panel adapted to be mounted in vertical orientation in an opening in the facade of a building so as to redirect incident daylight towards the ceiling of said building, said panel comprising a planar transparent plastic plate having parallel equally spaced apart laser cuts perpendicular to the surface of said plate, the depth of said laser cuts being such that the ratio of the spacing to the depth is less than unity.

4. A plane panel as in claim 3, further comprising:
   a thin transparent sheet attached to the face of said plate including said laser cuts to prevent the entry of moisture and dust.

5. A method of controlling the direction and amount of daylight entering a building comprising the steps of:
   incorporating a plurality of transparent light deflecting plates into louvered panels in an external opening in said building, wherein each of said plates has a plurality of parallel equally spaced apart laser cuts made perpendicularly through said plate such that said plate is divided into a series of parallel, equally spaced apart horizontally aligned parallelpipeds of rectangular cross section, said parallelpipeds being supported by a narrow continuum of said transparent plate extending around the periphery of said transparent plate and extending at intervals across said transparent plate in a direction perpendicular to the horizontal axis of said parallelpipeds;
   adjusting said louvered panels to the substantially closed position such that sunlight incident on said louvered panels is substantially transmitted into said building and deflected towards the ceiling, or adjusting said louvered panels to the substantially open position such that sunlight incident on said louvered panels is substantially deflected to the exterior of said building.

6. A method of controlling the direction and amount of daylight entering a building comprising the steps of:
   incorporating a plurality of transparent light deflecting plates into louvered panels in an external opening in said building, wherein each of said plates comprises a planar transparent plastic plate having parallel equally spaced apart laser cuts perpendicular to the surface of said plate, the depth of said laser cuts being such that the ratio of the spacing to the depth is less than unity;
   adjusting said louvered panels to the substantially closed position such that sunlight incident on said louvered panels is substantially transmitted into said building and deflected towards the ceiling, or adjusting said louvered panels to the substantially open position such that sunlight incident on said louvered panels is substantially deflected to the exterior of said building.

* * * * *